A. J. H. KUHSIEK.
BUMPER SUPPORTING BRACKET.
APPLICATION FILED MAR. 20, 1917.

1,322,121.  Patented Nov. 18, 1919.

Albert J. H. Kuhsiek, Inventor
By his Attorney

UNITED STATES PATENT OFFICE.

ALBERT J. H. KUHSIEK, OF RICHMOND HILL, NEW YORK, ASSIGNOR TO EDWARD V. HARTFORD, INC., A CORPORATION OF NEW YORK.

BUMPER-SUPPORTING BRACKET.

1,322,121.  Specification of Letters Patent.  Patented Nov. 18, 1919.

Application filed March 20, 1917. Serial No. 156,110.

*To all whom it may concern:*

Be it known that I, ALBERT J. H. KUHSIEK, a citizen of the United States, residing at Richmond Hill, in the county of Queens, city and State of New York, have invented certain new and useful Improvements in Bumper-Supporting Brackets, of which the following, taken in connection with the accompanying sheet of drawings, is a full, clear, and concise description thereof.

This invention relates to a motor vehicle bumper bracket, and has for one of its objects the provision of an attaching means for bumpers of the spring or yieldable type, said means being characterized by rigidity and simplicity of construction.

Another object of the invention is the provision of a bumper fastening means especially adapted for supporting a bumper at the rear of a car of the type in which the suspension member is mounted transversely of the chassis frame.

Another feature of my invention contemplates a bumper bracket which may readily be installed or secured to a car and not interfere with other parts of the chassis.

Another object is the provision of an attaching means for bumpers which is substantially self-adjusting in accommodating itself to the parts which it engages.

A further object is the provision of a bumper fastening means so constructed that when assembled it is adapted to accommodate and support any standard form of spring type bumpers. This is effected by so designing the bracket arms as to have a width at their supporting ends approximating the width of the space separating the attaching portions of the bumper.

A still further object is the provision of a bumper bracket which, in effect, functions as a supplemental shock absorber and is especially adapted to absorb a shock received at an angle to the face of the bumper.

The invention is illustrated in the accompanying drawing in which,—

Figure 1:
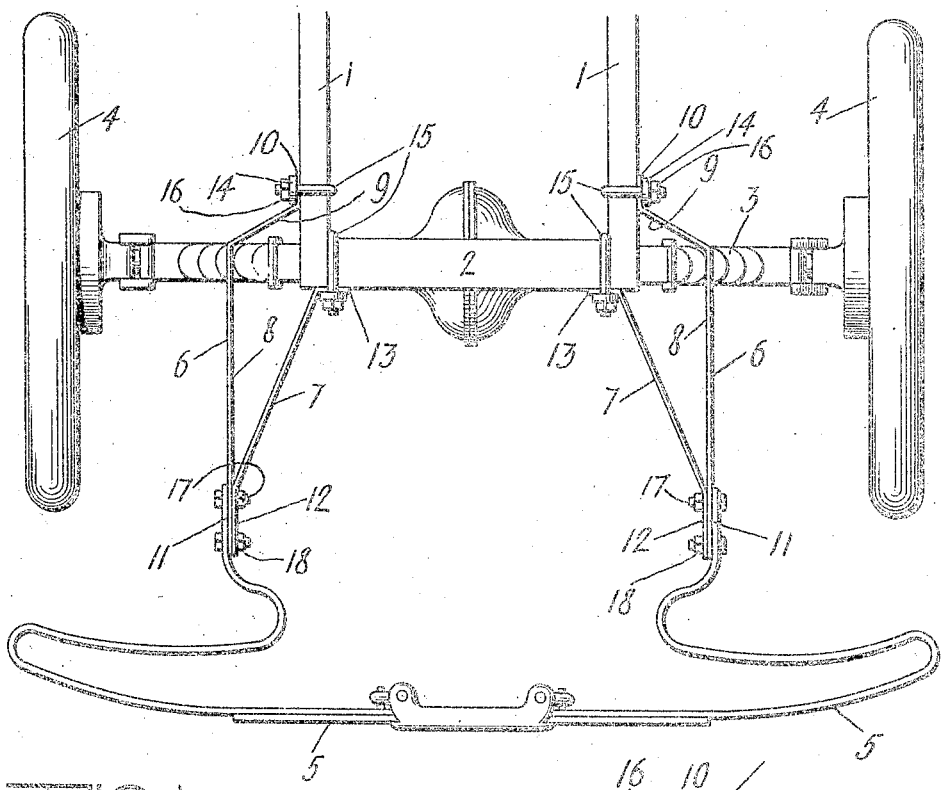
Figure 2:
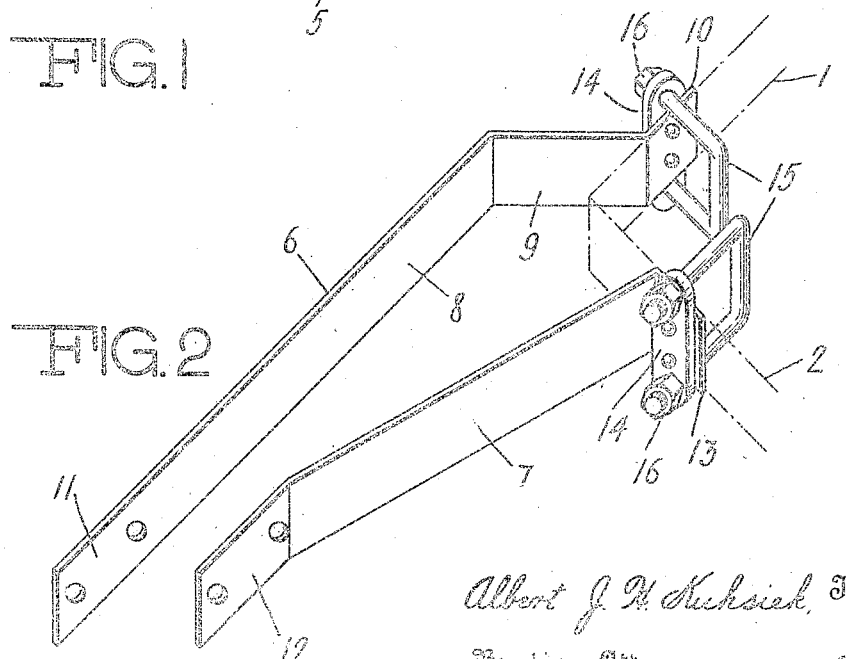

Figure 1 is a perspective of a part of the rear of an automobile chassis showing my bracket applied to the frame and supporting a common form of spring type bumper, and Fig. 2 is a perspective showing in detail the bracket arms and method of attaching the same to the frame of the chassis.

In the drawings, the numerals 1 and 2 represent, the sides and cross piece, respectively, of a chassis frame. A suspension member, which includes the spring 3, is mounted transversely of the frame and is supported by the wheels 4. The bumper bracket comprises a pair of preferably resilient arms or members 6 and 7. It will be noted that the members 6 and 7 are unitary structures and their resiliency is the inherent resiliency of the material of which they are constructed, also enhanced by their peculiar conformation. The bracket member 6 is of a greater length than its associate member 7, and is offset so as to provide a major and a minor body portion or section 8 and 10, respectively, which portions form the sides of an obtuse angle. The portion adjacent the end of section 9 is bent so as to occupy a plane parallel to the end 11 of section 8. The bracket member 7 has its ends 12 and 13, bent at angles to its body portion, this bending being carried sufficiently far to cause the end 12 to lie parallel to the end 11 of member 6, and the end 13 to occupy a plane at right angles to the end 12, or parallel to the cross piece 2 of the chassis frame. Secured transversely to each of the ends 10 and 13 of the bracket members, 6 and 7, respectively, are plates 14—14, respectively. These plates are of a width greater than that of the chassis frame members and are provided with apertures adapted to receive the ends of U-shaped bolts 15, which extend over the sides of the frame members. By tightening the nuts 16, the bracket arms may be made fast to the chassis frame members. The free ends of the bracket arms 6 and 7 are provided with alined apertures, and the bumper 5 may be fastened to these arms by means of bolts 17 provided with nuts 18, the bolts being passed through openings made in the attaching portions of the bumper.

It will be understood that in the assembly of the bracket, the end portions 11 and 12 of the arms 6 and 7, respectively, contact with each other in such a manner that the body portions of said arms contiguous to that of said ends form the sides of an acute angle and constitute a structure very substantial and capable of receiving severe shocks. It is also apparent that in fastening the bumper to the chassis frame, there is considerable advantage and utility in having the attaching means for the bracket arm substantially self-adjustable upon the frame members, as this form of construction affords an easy means for mounting the bumper.

From the above description it will be seen that the bumper bracket member contemplated by this invention is, in fact, a supplemental shock absorber. For example, if the bumper receives a shock, naturally the greater portion of it will be dissipated or absorbed by the bumper 5, but a considerable portion of it will be transmitted to the bracket members 6 and 7. This is especially true if the shock comes from a direction at an angle to the face of the bumper, and the greater this angle, the more stress will there be transmitted to the bracket members.

It will also be observed that bracket arm 6, is, in effect, a continuation of the attaching portion or end of the bumper 5, and that the arm 7 functions to reinforce the arm 6.

While I have herein shown and particularly described the preferred embodiment of my invention, I do not wish to be limited to the precise details of construction illustrated, as changes may be made without departing from the spirit and scope of my invention.

What is claimed is:

1. In a bumper attaching means, the combination with a motor vehicle frame, of a pair of inherently resilient attaching members each having one of its ends secured to the chassis frame, and given a conformation so that the free ends of both members meet at an acute angle and extend in a plane substantially parallel to the side members of the chassis frame.

2. In a bumper attaching means, the combination with a motor vehicle frame, of a pair of resilient attaching members, one of said members having the portion intermediate its ends bent at an obtuse angle and the ends thereof lying in substantially parallel planes, and the other of said members having the portions adjacent its ends bent so that said portions occupy planes at right angles to each other.

3. In a bumper attaching means, the combination with a motor vehicle frame, of a pair of resilient attaching members, one of said members having a portion intermediate its ends bent at an obtuse angle and the ends thereof lying in substantially parallel planes, and the other of said members having the portions adjacent its ends bent so that they occupy planes at right angles to each other, the ends of said members which lie in parallel planes being adapted to support a bumper.

4. In a bumper attaching means, the combination with a motor vehicle frame, of a pair of attaching members each having one of its ends secured to the chassis frame and the other ends meeting in adjacent parallel planes, and the body portions of said members forming an acute angle.

5. In a bumper attaching means, the combination with a motor vehicle frame, of a pair of attaching members, one of said members having an offset, the other of said members having its ends bent so as to occupy planes at right angles to each other, fastening means carried upon one end of each of said members for securing it to the chassis frame, and means provided at the other ends of each of said members for supporting a bumper.

6. In a bumper attaching means, the combination with the channel members and cross members of a vehicle frame, of a pair of attaching members each embodying portions having their ends formed at right angles to each other for attachment to the channel and cross members of the chassis at points in substantially the same horizontal plane, the other ends of said portions lying in parallel planes.

7. A bumper attaching means comprising a pair of unitary resilient members of unequal length, the longer of said members having portions relatively offset, the other of said members having the portion adjacent each of its ends bent over so that they occupy planes at right angles to each other, one end of each of said members being provided with means for supporting a bumper, and each of the other ends of said members having means for fastening it to the frame of a motor vehicle chassis.

8. A bumper attaching means comprising a pair of resilient members, one of said members having a major and a minor body portion, which portions form an obtuse angle, the other of said members having the portion adjacent each of its ends bent over so that they occupy planes at right angles to each other.

9. A bumper attaching means comprising a pair of resilient members, one of said members having a major and a minor body portion, which portions form an angle, the other of said members having the portion adjacent each of its ends bent over so that they occupy planes at right angles to each other, one of said bent-over end portions being adapted to contact with the end portion of the major body portion of said first-mentioned member.

10. In combination with a motor vehicle chassis having a transversely mounted suspension member, a bumper attaching means comprising a pair of resilient members forming a bracket suitable for attachment to said motor vehicle chassis and said transverse suspension member.

11. A bumper attaching means comprising a bracket formed by a pair of resilient members united at one end, the body portions of said members diverging from the point of union and terminating in attaching portions occupying planes at right angles to each other.

12. In combination with a motor vehicle frame and a rear suspension member extending transversely thereof, a bumper attaching means comprising a bracket formed of a pair of inherently resilient members of unequal length, the portions adjacent to one end of said members having contacting surfaces, the other ends of said members being provided with portions occupying planes at right angles to each other, whereby one of said members may be secured to the side, and the other to the rear part of said frame.

13. In combination with a motor vehicle chassis having a frame and a rear suspension member extending transversely the frame, a bumper attaching means comprising a pair of inherently resilient arms of different lengths adapted to be rigidly secured to the frame of the vehicle, and having converging portions terminating in contacting surfaces, whereby said arms will rigidly reinforce and support each other to form a bracket, and means for fastening a bumper to the free end of said bracket.

14. In combination with the frame of a motor vehicle, a bumper attaching means comprising a pair of attaching members of unequal lengths, the longer of said members having portions relatively offset, the other of said members having the portions adjacent its ends bent over so that they occupy planes at right angles to each other, one end of each of said members being provided with a plurality of apertures positioned to aline with the apertures of the other member, fastening bolts for supporting a bumper, said bolts being adapted to be received by said apertures, a U-shaped clamping bolt adapted to fit around the channel member of said frame, and each of the other ends of said members having a plate secured transversely thereof and provided with apertures adapted to accommodate the ends of said U-shaped clamping bolt, whereby said attaching means may be secured to the frame member of the chassis.

15. In combination with a motor vehicle chassis having a frame and a rear suspension member extending transversely of the frame, a bumper attaching means comprising an inherently resilient bracket having a pair of arm members converging at one of their ends, the free end of one of said frame members being adapted to be fastened to the side of the frame, and the corresponding end of said other member being adapted to be fastened to the end of said frame.

16. A bracket for supporting a spring bumper from the frame of a motor vehicle, comprising a supporting member, means for attaching the bumper to said supporting member whereby said member will constitute a physical continuation of the end of said bumper, and a reinforcing member for said supporting member connected to said member and to the vehicle frame, said latter connection being in a plane at a right angle to the plane of attachment of said supporting member to the frame.

17. In a bumper attaching means, the combination with a motor vehicle frame, of a pair of inherently resilient attaching members each having one of its ends secured to the frame and given a conformation so that the free ends of both members meet at an acute angle and extend in a plane substantially parallel to the side members of the chassis frame, and are arranged to receive one of the rearwardly extending parallel members of a standard bumper.

18. In a bumper attaching means, the combination with a motor vehicle frame, of a pair of attaching members each having one of its ends secured to the frame and given a conformation so that the free ends of both members meet at an acute angle and extend in a plane substantially parallel to the side members of the chassis frame, and are arranged to receive one of the rearwardly extending parallel members of a standard bumper.

19. In a bumper attaching means, the combination with a motor vehicle frame, of a pair of attaching members each having one of its ends secured to the frame, the other ends meeting in adjacent parallel planes, and the body portions of said members forming an acute angle, said meeting ends being arranged to receive one of the rearwardly extending parallel members of a standard bumper.

20. In a bumper attaching means, the combination with a motor vehicle frame, of a pair of attaching members resilient throughout their extent, one of said members having a portion intermediate its ends offset, the portions adjacent the ends thereof occupying parallel planes, and the other of said members having its ends bent so as to occupy planes at right angles to each other, fastening means carried upon one end of each of said members for securing it to the frame, and means provided at the other end of said members for supporting a bumper.

21. In a bumper attaching means, the combination with a motor vehicle frame, of a pair of inherently resilient unitary attaching members each having one of its ends secured to the chassis frame and given a conformation so that the free ends of both members meet at an acute angle and extend in a plane substantially parallel to the side members of the frame.

ALBERT J. H. KUHSIEK.